United States Patent [19]
Carrillo

[11] Patent Number: 6,083,096
[45] Date of Patent: Jul. 4, 2000

[54] TECHNIQUE FOR CLEANING INTESTINES OF SLAUGHTERED ANIMALS

[75] Inventor: John E. Carrillo, Nueces County, Tex.

[73] Assignee: CNR Stainless, Inc., Port Aransas, Tex.

[21] Appl. No.: 09/280,298

[22] Filed: Mar. 29, 1999

[51] Int. Cl.⁷ .................................................. A22C 17/16
[52] U.S. Cl. .......................................... 452/123; 452/173
[58] Field of Search .................................... 452/123, 173

[56] References Cited

U.S. PATENT DOCUMENTS

| | | |
|---|---|---|
| 964,006 | 7/1910 | Eberhardt . |
| 1,302,194 | 4/1919 | Mayer . |
| 1,492,697 | 5/1924 | Neuberth . |
| 2,100,587 | 11/1937 | Chalker . |
| 2,701,386 | 2/1955 | Strickler .................................. 452/123 |
| 3,049,749 | 8/1962 | Mayer . |
| 3,509,593 | 5/1970 | De Moss ................................. 452/123 |
| 4,293,980 | 10/1981 | Ward ....................................... 452/123 |
| 5,820,453 | 10/1998 | Burke ..................................... 452/123 |

*Primary Examiner*—Willis Little
*Attorney, Agent, or Firm*—G. Turner Moller

[57] ABSTRACT

An intestine or tripas cleaner cleans an entire tripas, without cutting the tripas into segments, thereby providing significant sanitation advantages. The cleaner comprises a rotatable accumulator onto which an unwashed tripas is wound while passing water through the inside and onto the outside. One end of the unwashed tripas is attached to a fitting which seals the tripas so water passes into the inside without leakage. Water is sprayed onto the outside of the tripas as the unwashed tripas is wound onto the accumulator. The wash water flows by gravity to the bottom of the accumulator and passes through a drain. Simultaneously with washing a tripas, a washed tripas is discharged from the accumulator through an outlet structure, preferably directly into a shipping box. Significant cost advantages are provided by reducing labor expense.

39 Claims, 3 Drawing Sheets

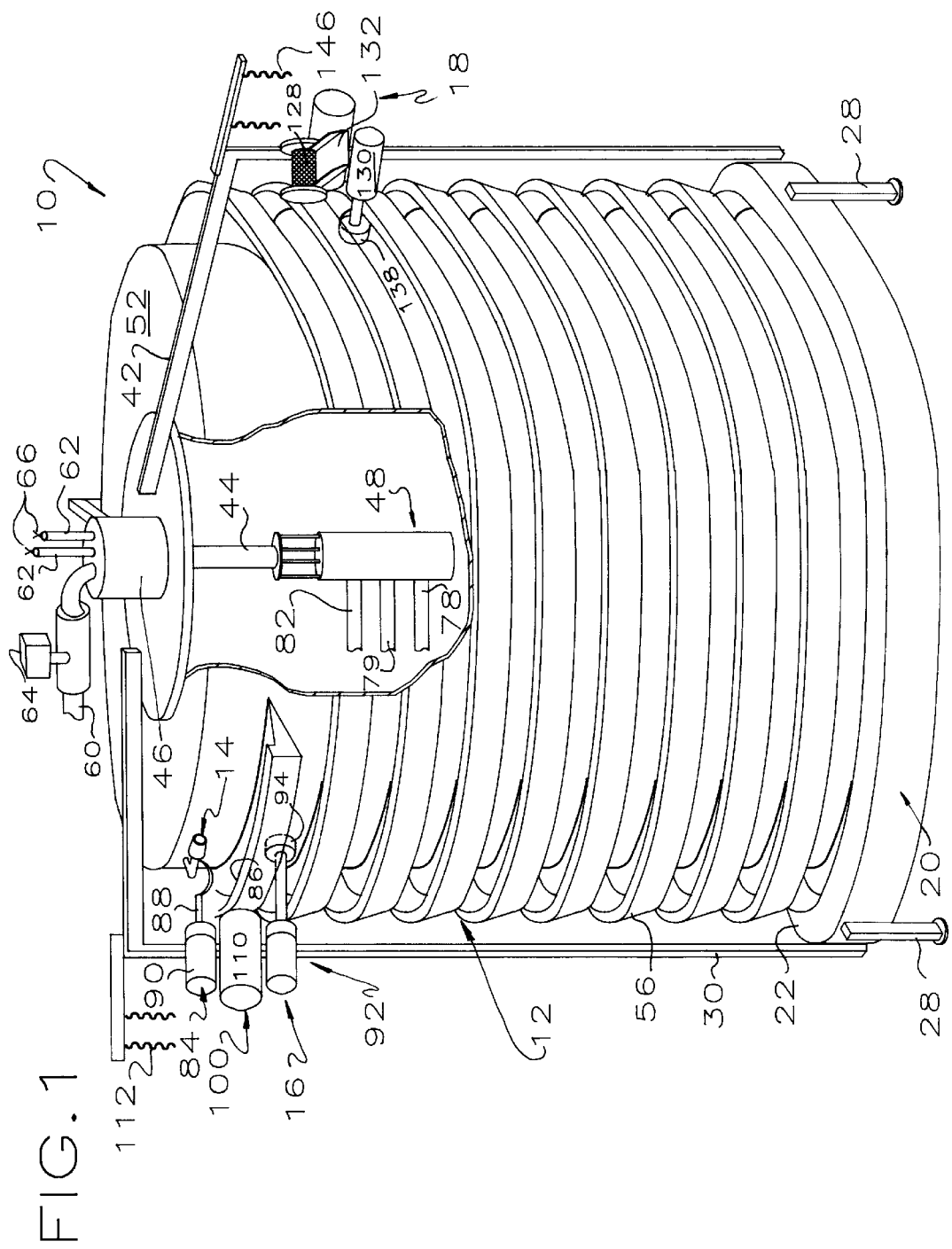

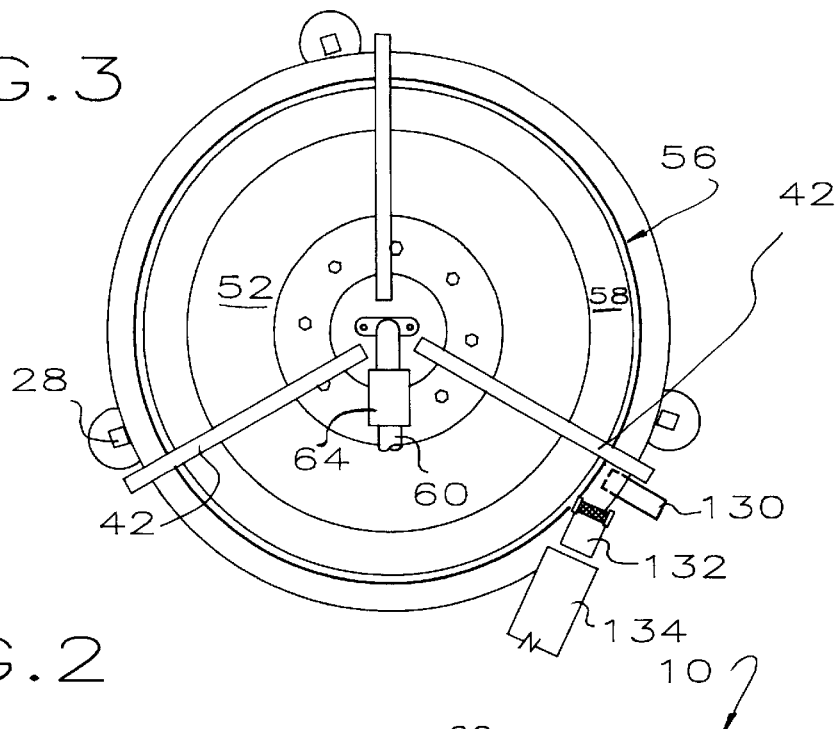
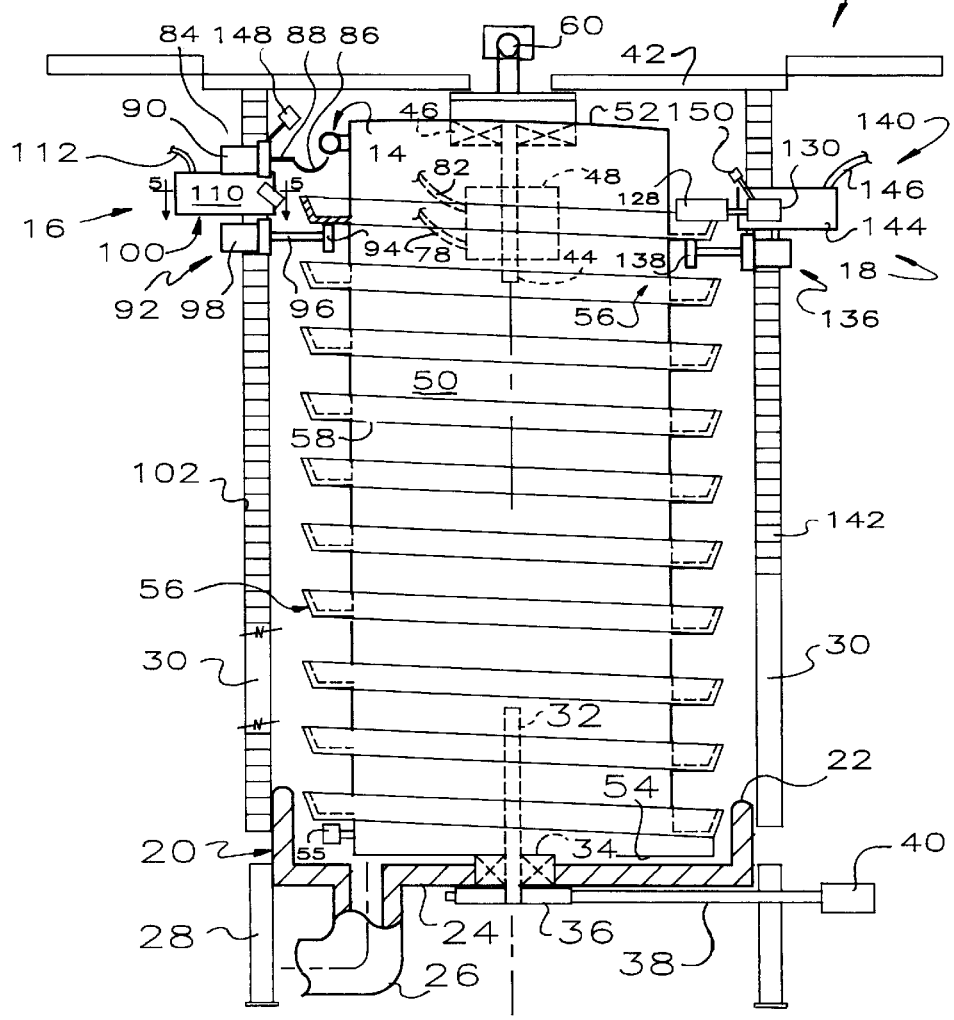

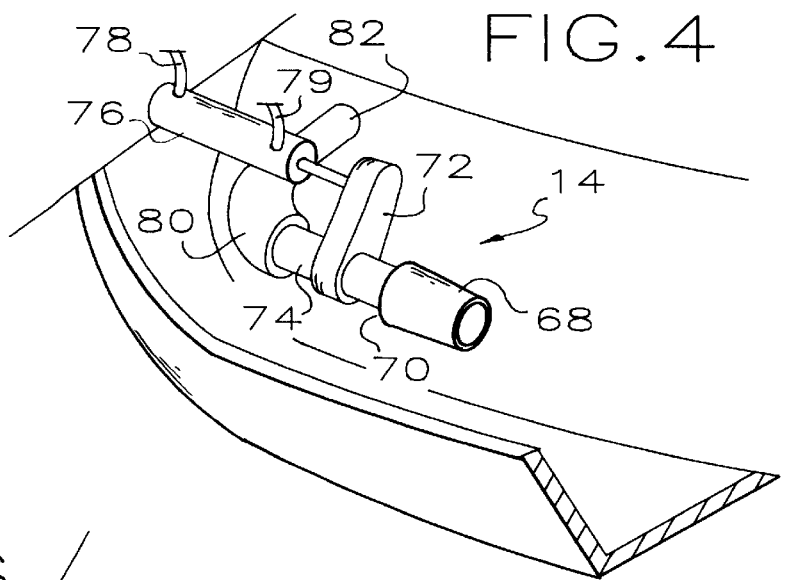
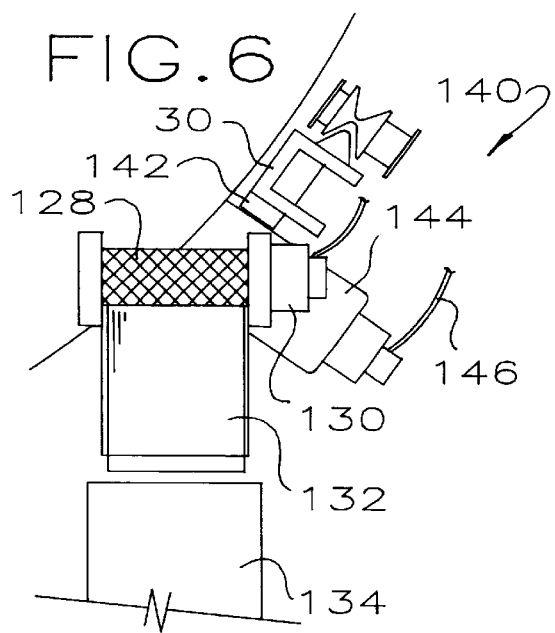
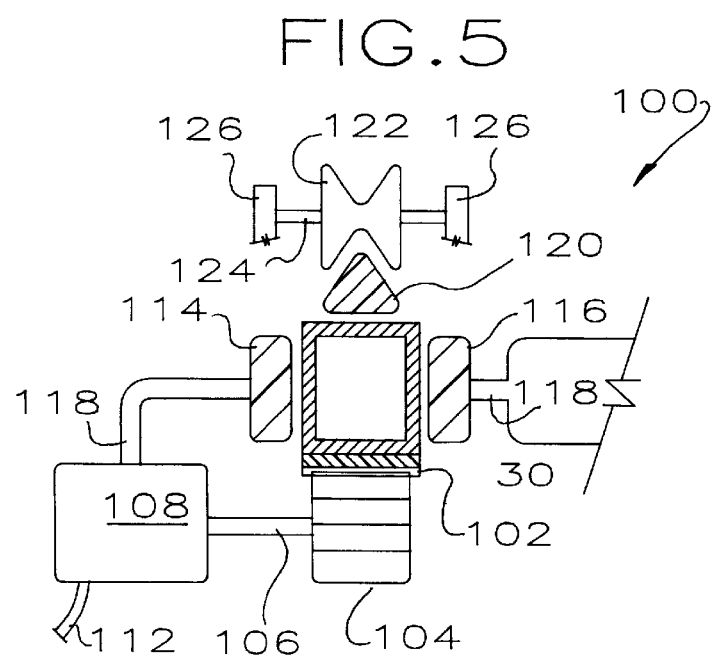

6,083,096

TECHNIQUE FOR CLEANING INTESTINES OF SLAUGHTERED ANIMALS

This invention relates to a method and apparatus for cleaning the intestines of domestic meat animals slaughtered in preparation for market.

BACKGROUND OF THE INVENTION

Although it may sound odd to the uninitiated, there is a significant market for the small intestines of large domesticated meat animals, i.e. cattle, sheep and hogs. In European and Hispanic cultures, these intestines are used in sausage making as the skin of sausage. In Hispanic cultures, intestines are known as tripas and are also prepared as a dish of that name. Additionally, other cultures of the world find intestines to be a delicacy.

It is accordingly necessary in a meat packing plant to clean the small intestines or tripas so they may be sold through conventional channels. At present, the standard technique is to cut the tripas into much shorter manageable lengths than appear in nature. The length of the small intestines of slaughtered domestic animals varies considerably, depending on the species and on the size of the individual animal. The longest tripas measured in the course of development of this invention was 76' which was from a very large steer or bull. The shortest tripas that can be expected in a meat packing plant is probably on the order of 20'. Typically, the tripas is cut into manageable lengths, such as 9–11', on a horizontal stainless steel table, placed over hooks extending from a spigot and allowed to hang vertically. The spigot is turned on. Some water runs inside and some splashes outside the tripas to flush the contents into a drain in the floor. The washed tripas are removed from the hooked spigots and piled on the floor until an armful is collected and placed in a shipping box.

This technique leaves much to be desired because it is both unsanitary and costly. Those workers cutting the tripas into 9–11' lengths must grab one end thereby contaminating that end. Cutting the tripas with a knife inherently contaminates both ends because the knife is not washed between cuttings. The worker does not have a hand to hold the loose end and some of the contents inevitably leak onto the table at the cut. When the cut section is pulled from the horizontal table to its vertical hanging position, some contents inevitably leak out the bottom onto the table and onto the floor. When the washed tripas are pulled from the hooks holding them in a vertical position, they are piled up on the floor and are ultimately picked up as a bundle by a worker and placed in a shipping box. All in all, it is not a pretty scene.

In addition, this process is labor intensive. In a packing plant killing 150 head of cattle an hour, there will be 13–15 people per shift working on the tripas line.

Disclosures of interest are found in U.S. Pat. Nos. 964,006; 1,302,194; 1,492,697; 2,100,587 and 3,049,749.

SUMMARY OF THE INVENTION

In this invention, the small intestine of large domesticated meat animals is cleaned in one piece, i.e. without cutting it into segments. As used herein, the entire tripas or the entire intestine is defined to mean all of the intestine cut from the animal, less any incidental trimming. This provides substantial sanitary advantages because the tripas is not contaminated by the act of cutting, the contents do not contaminate the tripas being cleaned and do not contaminate other tripas that have either been washed or are ready to be washed.

Because the small intestines of large domestic meat animals are quite long, some type accumulator is very desirable. The preferred accumulator of this invention comprises a rotating device having sufficient capacity to hold the longest tripas to be encountered. The worker places one end of the unwashed tripas onto a fitting, at the top of the accumulator, which seals the end. When the accumulator is turned on, it rotates and winds up the tripas in a helical rack or tray. Water is delivered through the fitting to flush contents from the inside while water is sprayed on the outside. Water runs downwardly on both the inside and the outside of the tripas and discharges from the bottom of the tray through a drain. Thus, gravity assists in draining the cleaning liquid and contents from the tripas.

After the entire tripas has been wound onto the accumulator and washed in the process, the accumulator is stopped and the worker disconnects the end of the washed tripas from the fitting and places the clean end in the outlet structure which is usually located within about 120° from the fitting. The end of an unwashed tripas is connected to the fitting and the accumulator rotates again in the same direction, discharging the washed tripas through an outlet structure onto a conveyor or other convenient structure while winding an unwashed tripas onto the accumulator at the same time. The process is repeated.

A prototype of the tripas cleaner of this invention is designed to clean an entire tripas having a maximum length of 80' with a cycle time of 40 seconds. It is believed that one worker on the machine will keep up with a meat packing operation killing 150 cattle/hour. Additional workers are required to weigh and box the tripas but these workers are also required with present techniques. Calculations will reveal that 40 seconds per intestine is not sufficient to keep up with a kill rate of 150 cattle/hour but the average intestine length is shorter than 80' and experience will inevitably increase the throughput. Thus, the practice of this invention provides both sanitary and cost advantages.

It is an object of this invention to provide an improved method and apparatus for cleaning tripas providing substantial advantages in sanitation and expense.

Another object of this invention is to provide a method and apparatus for cleaning the entire tripas without cutting it into segments.

A further object of this invention to provide a semiautomated technique for cleaning tripas in which the tripas is placed in an accumulator and washed.

Another object of this invention is to provide an apparatus for cleaning the inside and/or outside of a long flexible tubular article.

These and other objects and advantages of this invention will become more fully apparent as this description proceeds, reference being made to the accompanying drawings and appended claims.

BRIEF DESCRIPTION OF THE DRAWINGS

FIG. 1 is an isometric view of the front of a tripas cleaner of this invention;

FIG. 2 is a front view of the tripas cleaner of FIG. 1;

FIG. 3 is a top view of the tripas cleaner of FIGS. 1 and 2;

FIG. 4 is an isometric view showing a fitting used to secure and seal an upper end of the tripas as it is being washed;

FIG. 5 is an enlarged cross-sectional view of the tripas cleaner of FIG. 1, taken substantially along line 5—5 thereof, as viewed in the direction indicated by the arrows, the motor housing being broken away for clarity of illustration; and FIG. 6 is an enlarged isometric view of the outlet structure of this invention.

DETAILED DESCRIPTION

Referring to FIGS. 1–6, a tripas cleaner 10 of this invention comprises, as major components, an accumulator 12, a fitting 14 for securing and sealing one end of the tripas and for delivering a cleaning liquid through the tripas, an inlet structure 16 for loading tripas onto the accumulator 12, and an outlet structure 18 for discharging cleaned tripas from the cleaner 10.

The accumulator 12 is rotatably mounted. To this end, there is provided a circular stationary base 20 having a rounded lip 22, a bottom wall 24 having a drain 26 and a plurality of feet 28 for supporting the cleaner 10 on an underlying surface. A plurality of upstanding columns or standards 30 are welded or otherwise secured to the base 20. A stub shaft 32 extends upwardly from the bottom wall 24 and is mounted for rotation by a bearing 34 on the base 20. A pulley 36 or other suitable drive member is attached to the shaft 32 and is rotated by a belt 38 or other suitable device driven by a suitable motor 40 supported from the base 20. The shaft 32 is connected in any suitable manner to the accumulator 12 and accordingly rotates the accumulator 12 about an upright axis in response to operation of the motor 40.

The upper end of the accumulator 12 is supported by braces 42 connected to the columns 30. A stub shaft 44 extends downwardly through a bearing 46. The bearing 46 rotatably supports the upper end of the accumulator 12. As will be more fully explained hereinafter, a rotary valve or air-water distributor 48 makes connection to stationary air and water supply lines and delivers air and water to fittings on the rotating accumulator 12.

The accumulator 12 comprises a large central drum 50 closed by a top 52 and a bottom 54. Any condensation or leakage inside the drum 50 may be removed through a drain plug 55. A rack or tray 56 is attached to the side of the drum 50 and winds helically about its periphery. The drum 50 and tray 56 are made of a food compatible material, such as stainless steel, so the rack or tray 56 is typically welded to the drum 50. The diameter and height of the drum 50 are selected so the length of the tray 56 is longer than any expected small intestine. For use in a commercial beef packing plant, the drum 50 will be sufficiently large so the tray 56 is preferably on the order of at least 75' long because the longest small intestines to be encountered will be in this range. In order to partially achieve the advantages of this invention, a smaller device having a tray 56 on the order of about at least 40' long may be employed to wash intestines cut in half.

It will be seen that each segment of the tray 56 is lower than a preceding segment so the cleaning liquid runs smoothly to the bottom toward the drain 26 and does not accumulate along the way. An important feature of the tray 56 is a helically wound bottom wall 58 configured to cooperate with the inlet and outlet structures 16, 18 as will be more fully pointed out hereinafter.

Air and water are provided to the fitting 14 through the rotary valve or distributor 48 which is of conventional construction and may be obtained from Rotor Systems, Inc., Onoka, Minn., as a Model 8050, Series Rotary Union. To this end, a water supply conduit 60 and a pair of air supply conduits 62 connect to the distributor 48 through control valves 64, 66.

The fitting 14 acts to hold one end of the intestine, seal against the end and deliver a cleaning liquid into the inside of the intestine, as shown best in FIG. 4. To this end, the fitting 14 comprises a frustoconical end 68 for receiving and expanding one end of the intestine and provides a shoulder 70 facing away from the small dimension of the end 68. A movable abutment 72 is mounted for linear movement on a conduit stub 74 for abutting the shoulder 70 and thereby captivating the end of the intestine to the fitting 14. The abutment 72 is made of a food grade material, such as plastic, so it slides easily on the conduit stub 74. The air cylinder 76 is preferably of the double acting type having a pair of hoses 78, 79 for admitting and exhausting compressed air as controlled by the valves 66. The abutment 72 is accordingly moved by compressed air delivered from one of the air supply lines 62 through its valve 66 with air exhausting from the other end of the cylinder 76. The hoses 78, 79 accordingly extend through the cylindrical wall of the drum 50 and connect to the distributor 48.

The conduit stub 74 is connected by an ell 80 and conduit 82 to the distributor 48 for delivering water to the fitting 14 from the water supply line 60 through the distributor 48 and control valve 64. It will accordingly be seen that the operator pushes one end of the intestine onto the end 68 of the fitting 14 and actuates the air cylinder 76 to attach the unwashed intestine to the accumulator 12.

The inlet structure 16 guides the intestine onto the rack or tray 56 as the accumulator 12 rotates. To this end, the inlet structure 16 comprises a guide 84 providing a trough shaped finger 86 mounted on the extensible member 88 of an air cylinder 90 for movement toward and away from the accumulator 12. In its retracted position, the finger 86 is radially outward of the tray 56 so the guide 84 may move up and down on the column 30. In its extended position, the finger 86 overlies the tray 56 and, at the start position, is slightly above and rotationally forward from the fitting 14. As the accumulator 12 rotates in a clockwise direction and pulls on the intestine, an intermediate portion of the intestine slides over the finger 86 and falls into the tray 56. As will be apparent hereinafter, the air cylinder 90 moves downwardly on the column 30 as the intestine is wound onto the accumulator 12 so the finger 86 remains above the empty part of the tray 56 where the intestine is to be placed.

The guide 84 is accordingly mounted for vertical movement during rotation of the accumulator 12 so the finger 86 stays at a location to guide the intestine into an empty part of the tray 56. To this end, the inlet structure 16 includes a lowering assembly 92 providing a roller 94 mounted on the end of an extensible member 96 of an air cylinder 98 for movement toward and away from the accumulator 12. In its retracted position, the roller 94 is radially outward of the tray 56 so the lowering assembly 92 is capable of moving upwardly relative to the accumulator 12. It will accordingly be seen that rotation of the accumulator 12 acts to wind up the intestine onto the rack 56 as guided by the finger 86 which moves downwardly in response to rotation of the accumulator 12 because the roller 94 engages the smooth bottom wall 58 of the tray 56 and thereby forces the guide 84 downwardly.

In order to start a new cycle of operation, it is necessary to raise the guide 84 and the lowering assembly 92. To this end, the inlet structure 16 includes a raising assembly 100 shown best in FIGS. 1, 2 and 5 providing a rack 102 fixed to the standard 30 and a gear 104 in meshing engagement with the rack 102 and mounted on a shaft 106 of an air motor 108 inside a housing 110 shown in FIGS. 1 and 2 and eliminated from FIG. 5 for purposes of illustration. Air is continuously delivered to the motor 108 through a flexible conduit 112 thereby continuously driving the motor 108 and gear 104 in a direction to move the raising assembly 100 upwardly. Thus, the inlet structure 16 moves downwardly when the accumulator 12 is being loaded because the roller 94 engages the helical bottom wall 58 of the tray 56 which forces the inlet structure 16 downwardly against the force of the motor 108 in response to rotation of the accumulator 12. When the roller 94 and guide finger 86 are retracted at the end of the loading cycle, the inlet structure 16 moves upwardly because the motor 108 is continuously urged upwardly by compressed air through the hose 112. Upward movement of the inlet structure 16 occurs at the end of a loading cycle when an intestine has been loaded onto the accumulator and washed, either in response to a command by the operator or automatically in response to a sensor (not shown).

The guide 84, the lowering assembly 92 and the raising assembly 100 are constrained for linear movement along the standard 30. Thus, one or more guide blocks 114, 116 are mounted on brackets 118 comprising part of the inlet structure 16. An elongate guide strip 120, triangular in cross-section, extends along the length of the standard 30 and cooperates with a guide wheel 122 mounted for rotation by a shaft 124 supported by a suitable bracket 126 comprising part of the inlet structure 16. It will accordingly be seen that the inlet structure 16 guides the intestine onto the accumulator 12 in response to rotation of the drum 50, taking into account the change in elevation of loading as it occurs.

When an intestine is completely loaded onto the accumulator 12 and washed in the process, one loading cycle is complete. It is necessary to unload the washed intestine from the accumulator 12 and reload the accumulator with an unwashed intestine. These are preferably done simultaneously.

To start, the inlet structure 16 is raised to its starting position and the operator manipulates the air cylinder 76 to release the upper end of the washed intestine from the fitting 14. The operator pulls the intestine off the fitting 14 and flips it into the outlet structure 18, attaches the end of an unwashed intestine to the fitting 14, operates the control panel (not shown) to advance the finger 86 and the roller 94 and starts the accumulator 12 rotating again.

The function of the outlet structure 18 is to assist removing the washed intestine from the accumulator 12 and deliver it to a conveyor which elevates the washed intestine to a work table where another worker puts it into a shipping box and weighs it. As shown best in FIGS. 1, 2 and 6, the outlet structure 18 is preferably located at some distance from the inlet structure 14, typically between 120–180°, and comprises a wide wheel or drum 128, which may preferably be knurled, rotated by a motor 130 to assist the washed intestine to exit from the accumulator 12. A chute 132 is located under the driven drum 128 and directs the exiting washed intestine toward a conveyor 134 for elevating the washed intestine to a work table where the tripas can be boxed and weighed. To here The outlet structure 18 includes a lowering assembly 136 substantially identical to the lowering assembly 92 and including a roller 138 engaging the bottom 58 of the tray 56 forcing the outlet structure 18 downwardly in response to rotation of the drum 50. The outlet structure 18 also includes a raising structure 140 substantially identical to the raising assembly 100 for raising the outlet structure at the end of an unloading cycle and thus comprises a rack 142 on the upright and a pneumatic motor 144 continuously driven through a flexible air line 146.

Operation of the cleaner 10 of this invention should now be apparent. When the accumulator 12 is empty, the worker manipulates an air control (not shown) to extend the finger 84 and roller 94, then pushes one end of the intestine onto the fitting 14 and manipulates a control panel (not shown) to extend the air cylinder 76 thereby captivating the intestine to the fitting 14. In response to a command by the operator, the accumulator 12 begins rotating. Preferably after a short delay, water begins passing through the fitting 14 to flush the contents of the intestine toward the drain 26 in response to an automatic command from a controller (not shown). After a similar delay, water beings spraying from a nozzle 146 the inlet structure 16 to wash the outside of the intestine. It may be desirable to deliver a light water spray onto the washed intestine, which may be accomplished by a nozzle 148 on the outlet structure 18. The loading cycle of the cleaner 10 continues until the entire intestine has been wound up onto the accumulator 12 and washed in the process.

When the roller 94 reaches a predetermined stop at the bottom of the tray 56, or in response to the operator's command or a sensor recognizing that the intestine being cleaned is wound onto the accumulator 12, the roller 94 and finger 86 are retracted radially outwardly from the tray 56 or other obstructions of the accumulator 12. When the roller 94 moves out of contact with the tray bottom 58, the raising means 100 elevates the inlet structure 16 from its lowermost position to its uppermost position in preparation for loading another tripas onto the accumulator.

As the inlet structure 16 is moving upwardly, the controller (not shown) stops the accumulator 12 so the fitting 14 is adjacent the inlet structure 16 as shown in FIGS. 1 and 2. The operator now releases the washed tripas from the fitting 14 and flips the clean end into the outlet structure 18. The end of an unwashed tripas is then attached to the fitting 14 and the cleaner 10 is restarted to wind up another intestine onto the tray 56. Because the outlet structure 18 unloads the tray 56 as the accumulator 12 rotates, it will be seen that the tray 56 is empty when it reaches the guide finger 86 so an unwashed tripas may be loaded into the empty tray.

While an unwashed tripas is being wound up onto the accumulator 12, the washed tripas is being unloaded through the outlet structure 18. After the clean end of the washed tripas is flipped onto the drum 128, the washed tripas slides onto the chute 132 and then onto the conveyor 134. After the washed tripas is unloaded from the accumulator 12, the outlet structure 18 is raised in much the same manner as the inlet structure 16. It will be appreciated that the tripas are usually of similar length but are not normally of identical length. Thus, the raising of the outlet structure 18 may occur before or after raising of the inlet structure 16 or they may be raised together after the longer intestine is either wound onto the accumulator 12 or unwound.

Although this invention has been disclosed and described in its preferred forms with a certain degree of particularity, it is understood that the present disclosure of the preferred forms is only by way of example and that numerous changes in the details of operation and in the combination and arrangement of parts may be resorted to without departing from the spirit and scope of the invention as hereinafter claimed.

I claim:

1. A method of cleaning an intestine of a slaughtered animal comprising winding the entire intestine onto a rotary accumulator and passing the cleaning liquid through the inside of the wound intestine while the entire intestine is in one piece.

2. The method of claim 1 wherein winding the entire intestine onto the accumulator and passing the cleaning liquid through the intestine occur at the same time.

3. The method of claim 2 wherein winding the intestine onto the accumulator starts prior to passing the cleaning liquid through the intestine.

4. The method of claim 1 wherein winding the entire intestine onto the rotary accumulator comprises rotating the accumulator.

5. The method of claim 4 wherein rotating the accumulator comprises unwinding a washed intestine from the accumulator.

6. A method of cleaning a flexible tubular article comprising winding the article onto a rotary accumulator and passing a cleaning liquid through the inside of the wound article.

7. The method of claim 6 wherein the article is an intestine of a slaughtered animal.

8. The method of claim 7 wherein winding the intestine onto the accumulator and passing the cleaning liquid through the intestine occur at the same time.

9. The method of claim 8 wherein winding the intestine onto the rotary accumulator comprises rotating the accumulator.

10. The method of claim 9 wherein rotating the accumulator comprises unwinding a washed intestine from the accumulator at the same time that a intestine is wound onto the accumulator.

11. The method of claim 9 wherein rotating the accumulator comprises rotating the accumulator about an upright axis.

12. A method of cleaning a flexible tubular article, having first and second ends, comprising placing the article into an accumulator; passing a cleaning liquid in contact with the inside of the article from the first end to the second end while it is on the accumulator and discharging the cleaned article.

13. The method of claim 12 wherein the flexible tubular article is an intestine of a slaughtered animal.

14. The method of claim 13 wherein the discharging step comprises discharging the cleaned intestine, while empty, onto a conveyor.

15. A method of cleaning a flexible tubular article comprising placing the article on a rack where the article describes a multiplicity of arcuate bends and each successive segment of the article is lower than a preceding segment, passing a cleaning liquid into an upper end of the article and through the inside of the article when it is on the rack and allowing the cleaning liquid to flow out of a lower end of the article.

16. The method of claim 15 wherein the article is an intestine of a slaughtered animal.

17. A method of cleaning a flexible tubular article, comprising
placing a first end of the article on a fitting and sealing between the first end and the fitting,
placing a substantial length of the article in a rack of an accumulator so that a second end of the article is at a lower elevation than the first end,
when the article is in the accumulator, passing a cleaning liquid through the fitting into the first end and out the second end so all of the cleaning liquid passes in cleaning contact through all of the article and thereby cleaning the inside of the article, and
passing a cleaning liquid on the outside of the article.

18. The method of claim 17 wherein the article is an intestine of a slaughtered animal.

19. The method of claim 18 wherein the step of placing a substantial length of the intestine in an accumulator comprises placing the entire intestine in the accumulator.

20. The method of claim 18 wherein the step of placing a substantial length of the intestine in an accumulator comprises winding the intestine onto the accumulator.

21. The method of claim 18 wherein the winding step comprises rotating the accumulator.

22. The method of claim 18 wherein winding step comprises winding the intestine onto a tray.

23. The method of claim 18 wherein the winding step comprises winding the intestine into a helical shape onto a helical tray.

24. The method of claim 18 wherein rotating the accumulator comprises unwinding a cleaned intestine from the accumulator contemporaneously with winding an unwashed intestine onto the accumulator.

25. A method of cleaning an intestine of a slaughtered animal comprising passing a cleaning liquid through the inside of at least fifty feet of the intestine while in one piece.

26. A cleaner for a flexible tubular article having an inside and an outside, comprising
an accumulator comprising a rack having an upper and a lower end for receiving a substantial length of the tubular article;
an inlet structure for delivering the tubular article into the accumulator rack;
a fitting adjacent the upper end of the rack for receiving a first end of the tubular article and sealing between the fitting and the first end; and
means for delivering a cleaning liquid through the fitting and into the first end of the tubular article and delivering all of the cleaning liquid through all of the inside of the tubular article for flushing the contents of the tubular article toward the lower end of the rack.

27. The cleaner of claim 26 wherein each successive section of the rack is lower than a preceding section.

28. The cleaner of claim 26 wherein the accumulator comprises a rotary accumulator wherein the tubular article is wound onto the rack.

29. The cleaner of claim 28 wherein the rotary accumulator includes means for rotating the accumulator about an axis and the inlet structure comprises means for winding the tubular article onto the rack as the accumulator rotates.

30. The cleaner of claim 29 wherein the axis is an upright axis.

31. The cleaner of claim 29 wherein the rack arcuately extends about the axis of rotation of the accumulator.

32. The cleaner of claim 31 wherein the rack is helical.

33. The cleaner of claim 32 wherein the rack comprises a generally U-shaped tray.

34. The cleaner of claim 28 further comprising an outlet structure for removing a washed tubular article from the accumulator.

35. The cleaner of claim 34 wherein the outlet structure comprises means for unwinding a washed tubular article from the accumulator at the same time that an unwashed tubular article is wound onto the accumulator.

36. The cleaner of claim 26 further comprising an outlet structure for removing a washed tubular article from the accumulator.

37. The cleaner of claim 36 wherein the outlet structure comprises means for removing a washed tubular article from the accumulator at the same time that an unwashed tubular article is placed in the accumulator.

38. The cleaner of claim 26 wherein the accumulator is mounted for rotation about an upright axis and further comprising means responsive to rotation of the accumulator for moving the inlet structure vertically relative to the accumulator for delivering the flexible article into the accumulator.

39. The cleaner of claim 26 wherein the accumulator is mounted for rotation about an upright axis and further comprising an outlet structure for discharging a clean article from the accumulator and means responsive to rotation of the accumulator for moving the outlet structure vertically relative to the accumulator for delivering the flexible article out of the accumulator.

* * * * *